June 7, 1949.  J. C. MEADOR  2,472,540
PISTON RING
Filed March 14, 1945  2 Sheets-Sheet 1
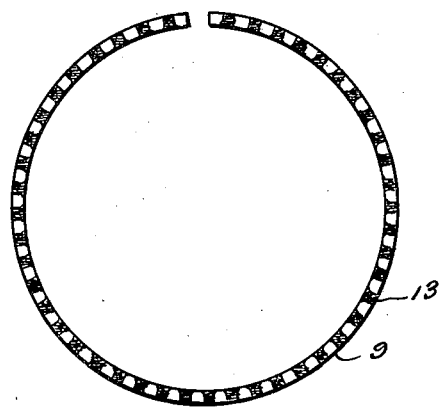
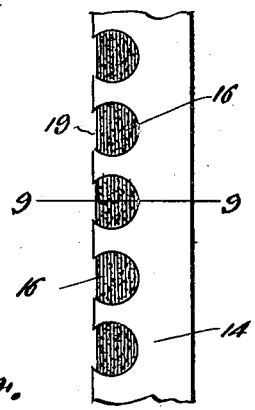
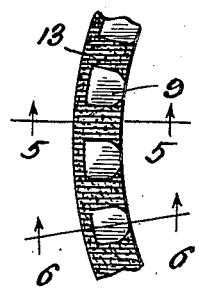
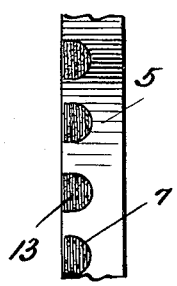
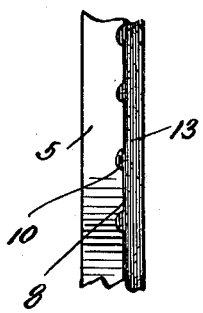
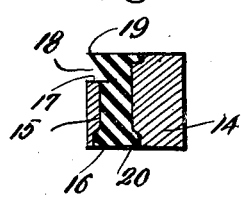
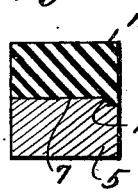
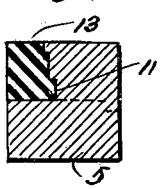
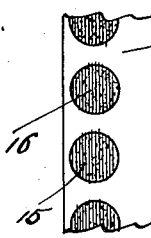
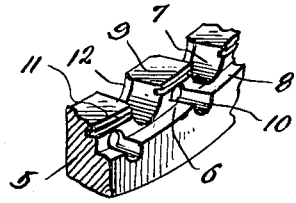
Inventor
JIM C. MEADOR
By Randolph & Beavers
Attorney June 7, 1949. J. C. MEADOR 2,472,540
PISTON RING
Filed March 14, 1945 2 Sheets-Sheet 2
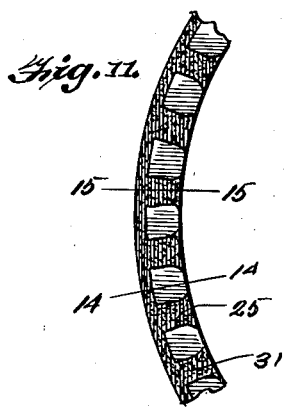
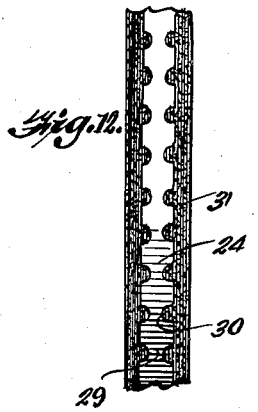
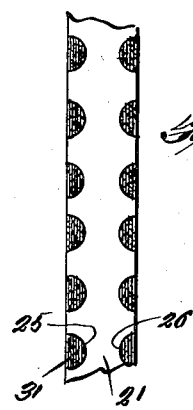
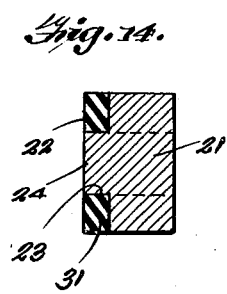
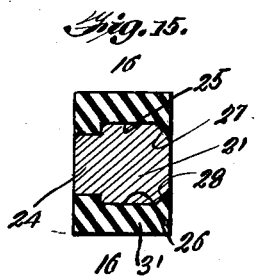
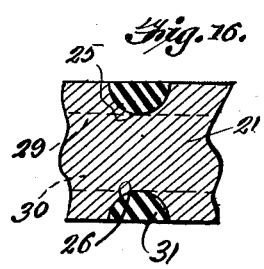
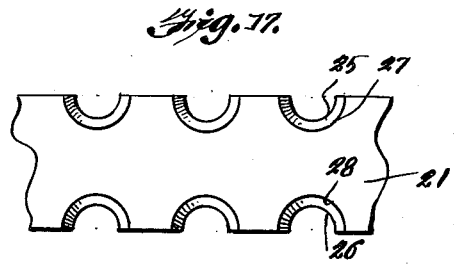
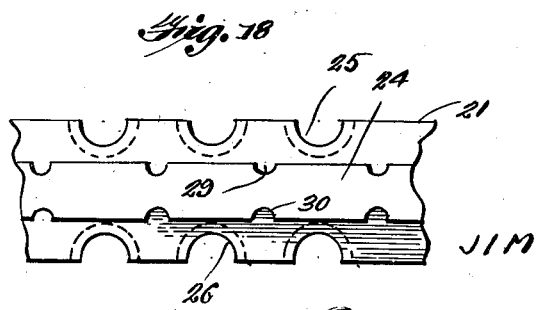
Inventor
JIM C. MEADOR
By Randolph & Beavers
Attorney Patented June 7, 1949

2,472,540

UNITED STATES PATENT OFFICE 2,472,540

PISTON RING

Jim C. Meador, Shreveport, La.

Application March 14, 1945, Serial No. 582,658

8 Claims. (Cl. 309—44)

1

The present invention relates to new and useful improvements in piston rings and has for its primary object to construct a portion of the ring with resilient material which, when subjected to pressure will become more compressed to provide a more effective seal with the cylinder wall.

More specifically the invention comprises a metallic piston ring having recesses in its outer surface as well as in its upper surface, or in both its upper and lower surfaces and within which a compressible material is contained so that when the said compressible material is subjected to pressure in the cylinder a more effective seal is provided between the ring and the cylinder wall.

A further object of the invention is to provide a device of this character of simple and practicable construction, which is efficient and reliable in use and relatively inexpensive to manufacture and otherwise well adapted for the purposes for which the same is intended.

Further objects and advantages reside in the details of construction as more fully hereinafter described and claimed, reference being had to the accompanying drawings forming a part hereof wherein like numerals refer to like parts throughout and in which:

Figure 1 is a top plan view of one embodiment of the invention;

Figure 2 is an enlarged fragmentary top plan view;

Figure 3 is a fragmentary elevational view of the inside of the ring;

Figure 4 is a similar view of the outside of the ring;

Figures 5 and 6 are sectional views taken substantially on the lines of 5—5 and 6—6 of Figure 2;

Figure 7 is a fragmentary perspective view before providing the ring with the compressible material;

Figure 8 is a fragmentary top plan view of a modified construction;

Figure 9 is a transverse sectional view taken substantially on line 9—9 of Figure 8;

Figure 10 is a fragmentary bottom plan view of said modified construction;

Figure 11 is a fragmentary top plan view of a further modification showing the compressible material at both the top and bottom edges of the ring and along the outer surface thereof;

Figure 12 is a fragmentary side elevational view of the outer surface of the ring;

Figure 13 is a similar view of the inner surface of the ring;

Figures 14 and 15 are sectional views taken respectively on the lines 14—14 and 15—15 of Figure 11;

Figure 16 is a fragmentary sectional view taken substantially on line 16—16 of Figure 15;

Figure 17 is a fragmentary side elevational view

2 of the inner side of the ring with the compressible material removed; and

Figure 18 is a similar view of the outer surface of the ring.

Referring now to the drawings in detail and first with respect to the form of invention illustrated in Figures 1 to 7 inclusive the numeral 5 designates the metallic piston ring having its outer surface stepped or rabbeted as shown at 6 to reduce the width of the ring at the upper portion thereof.

The upper surface of the ring is formed with a plurality of transversely extending rounded recesses 7, the bottom of the recesses terminating slightly above the shoulder 8 of the step. The recesses 7 thus define a plurality of upwardly projecting lugs 9 on the upper surface of the ring.

A plurality of transversely extending recesses 10 are also formed in the upper surface of the shoulder 8 and extend into the adjacent surface of the sides of the lugs 9 as will be apparent from inspection of Figure 7 of the drawings, the recesses 10 thus being formed at the outer surface of the ring.

The outer surfaces of the lugs 9 are also formed with circumferentially extending grooves 11 and the recesses 7 at the inner side of the ring are counter-sunk as indicated at 12.

The recesses 7 and 10 are filled with a moulded resilient material, such as synthetic or natural rubber indicated at 13, the resilient material also covering the outer surfaces of the lugs 9 to a position flush with the outer surface of the lower surface of the ring as will be apparent from an inspection of Figures 5 and 6 of the drawings. Accordingly the upper portion of the outer surface of the ring is provided with a resilient material which extends circumferentially entirely around the ring, as more fully indicated in Figure 4 of the drawings, the recesses 7 and 10 as well as the countersink 12 serving to anchor the resilient material in position on the ring.

In the form of the invention illustrated in Figures 8 to 10 inclusive the ring 14 is formed with circumferentially spaced transversely extending openings 15 in which the resilient material 16 is placed.

The outer surface of the ring 14 is also stepped or rabbeted as indicated at 17 to reduce the width of the ring at its upper portion, the opening 15 extending through the shoulder formed by the step.

The resilient material 16 also covers the outer surface of the reduced upper portion of the ring and the exposed outer surface of the resilient material is undercut as indicated at 18 to form a circumferentially extending groove having sloping walls as will be apparent from an inspection of Figure 9 of the drawings, to provide an overhanging lip 19 at the upper outer edge of the resilient material.

The ends of the openings 15 at the bottom of the ring are counter-sunk as shown at 20 to anchor the resilient material in the openings.

In the form of the invention illustrated in Figures 11 to 18 inclusive the outer surface of the ring 21 is formed with upper and lower rabbeted or stepped portion 22 and 23 to define a rib 24 extending circumferentially around the outer surface of the ring.

The reduced upper and lower portions of the ring are formed with transversely extending recesses 25 and 26 counter-sunk as indicated at 27 and 28 at the inner surface of the ring and the upper and lower edges of the rib 24 are also formed with transversely extending recesses 29 and 30.

The resilient material 31 is moulded in the recesses 25, 26, 29 and 30 and also extend circumferentially around the reduced upper and lower portions of the ring above and below the rib 24 and flush with the latter as will be apparent from an inspection of Figures 14 and 15 of the drawings.

In the operation of the device the resilient material carried by the several forms of the ring is subjected to pressure within the cylinder whereby to expand the resilient material into tight fitting engagement with the cylinder wall whereby to provide an effective seal between the piston in which the piston ring is mounted and the walls of the cylinder.

It is believed the details of construction, manner of operation and advantages of the device will be readily understood from the foregoing without further detailed explanation.

It is to be understood however that even though I have herein shown and described the preferred embodiments of my invention that the same is susceptible to certain changes fully comprehended by the spirit of the invention as herein described, and the scope of the appended claims.

While the foregoing specification sets forth the invention in specific terms, it is to be understood that numerous changes in the shape, size and materials may be resorted to without departing from the spirit and scope of the invention as claimed hereinafter.

Having thus described the invention, what I claim as new is:

1. A metallic piston ring having a stepped upper portion at its outer surface to reduce the thickness of the ring at its upper portion, transversely extending recesses in the reduced portion of the ring, and a filler of resilient material positioned in said recesses and covering the outer surfaces of the reduced portion of the ring flush with the outer surface of the lower portion thereof, said resilient material being responsive to pressure within a cylinder within which the ring is working to expand the resilient material against the wall of the cylinder.

2. A metallic piston ring having its outer surface at the upper portion of the ring stepped to reduce the thickness of the upper portion of the ring, a packing of resilient material surrounding the ring at the reduced portion thereof and flush with the outer surface of the lower portion of the ring, the outer surface of the ring at its narrow and wide portions having transversely extending recesses therein and adapted to receive portions of the filler to anchor the filler to the ring.

3. A metallic piston ring having its outer surface at the upper portion of the ring stepped to reduce the thickness of the upper portion of the ring, a packing of resilient material surrounding the ring at the reduced portion thereof and flush with the outer surface of the lower portion of the ring, said reduced portion of the ring having transversely extending recesses therein, said recesses being counter-sunk at the inner surface of the ring and said recesses and said counter-sunk portions being adapted to receive a portion of the packing to anchor the packing to the ring.

4. A metallic piston ring having its upper portion reduced in thickness and provided with transversely extending openings communicating with the reduced upper portion of the ring, a filler of resilient material positioned in said openings and surrounding the outer surface of the ring at the reduced portion thereof and an overhanging lip at the upper outer edge of said filler material.

5. A metallic piston ring having its upper portion reduced in thickness and provided with transversely extending openings communicating with the reduced upper portion of the ring, a filler of resilient material positioned in said openings and surrounding the outer surface of the ring at the reduced portion thereof, said filler material at the reduced portion of the ring having a circumferentially extending groove provided with a sloping wall and forming an overhanging lip at the upper outer edge of the resilient material.

6. A metallic piston ring having a relatively flat annular rib on its outer surface between the upper and lower edges of the ring to reduce the thickness of the ring above and below the rib, the upper and lower edges of the ring and the upper and lower edges of the rib having transversely extending recesses therein and a packing of resilient material extending circumferentially around the ring at the upper and lower reduced portions thereof and flush with the surface of the rib, said packing material having portions positioned in said recesses to anchor the packing material to the ring.

7. A metallic piston ring having its outer surface at the upper portion of the ring, stepped to reduce the thickness of said portion, the upper surface of the inner part of the ring having radially extending circumferentially spaced grooves in the upper part thereof, said grooves opening into the stepped part of the ring, and a packing of resilient material surrounding the ring at the reduced portion thereof and anchored in said grooves, said material being disposed flush with the outer surface of the lower portion of the ring.

8. A piston ring as in claim 7, said grooves combining to form upwardly extending circumferentially spaced lugs, said lugs having recesses in their outer faces opening into the reduced portion of the ring to receive and anchor portions of the resilient material.

JIM C. MEADOR.

REFERENCES CITED

The following references are of record in the file of this patent:

UNITED STATES PATENTS

| Number | Name | Date |
|---|---|---|
| 1,208,605 | Mastin | Dec. 12, 1916 |
| 1,817,095 | Penick et al. | Aug. 4, 1931 |
| 2,002,122 | McWane | May 21, 1935 |
| 2,385,045 | Wallace | Sept. 18, 1945 |
| 2,386,873 | Mercier | Oct. 16, 1945 |

FOREIGN PATENTS

| Number | Country | Date |
|---|---|---|
| 2,151 | Great Britain | Dec. 12, 1896 |